Figure 1:
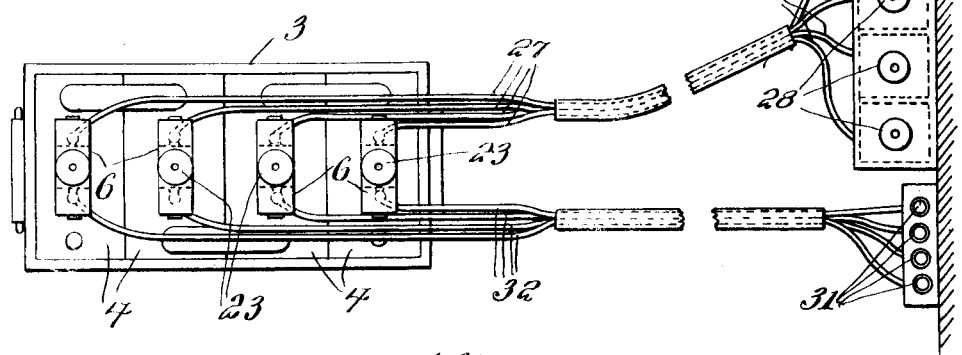

March 17, 1925.  1,530,430

W. A. SKELTON

REFILLER AND LIQUID LEVEL INDICATOR FOR BATTERY CELLS

Filed May 10, 1922

Inventor:
W. A. Skelton,

Attorney.

Patented Mar. 17, 1925.

1,530,430

UNITED STATES PATENT OFFICE.

WALTER A. SKELTON, OF ALVARADO, TEXAS.

REFILLER AND LIQUID-LEVEL INDICATOR FOR BATTERY CELLS.

Application filed May 10, 1922. Serial No. 559,935.

*To all whom it may concern:*

Be it known that I, WALTER A. SKELTON, a citizen of the United States, residing at Alvarado, in the county of Johnson and State of Texas, have invented new and useful Improvements in Refillers and Liquid-Level Indicators for Battery Cells, of which the following is a specification.

This invention relates to water refilling devices and liquid level indicators for wet cell storage batteries, the primary object of the invention being to provide means of a simplified and improved nature and operating in an extremely simple manner for replenishing the wet cells with fresh water, without resorting to the cumbersome and inaccurate methods heretofore proposed for the same purpose.

A further object of the invention is to provide an indicator device in connection with the battery, whereby the liquid level in the latter may at all times be determined, so that leakages due to faulty battery cell construction or from evaporation may at once be determined.

A further object of the invention is to provide a refill and indicator device for batteries of the character stated for use particularly in connection with motor vehicles, and wherein the operator of the vehicle may be apprised from his position in the driver's seat of the exact quantity of fluid in all of the cells of his battery, and which may be operated from said position to replenish the liquid supply in any one or more of the said cells.

With these general objects in view, together with others which will appear as the description proceeds, the invention consists in the novel construction, combination and arrangement of parts, all as will be described more fully hereinafter, illustrated in the drawing, and particularly pointed out in the claims.

In the drawing,—

Figure 2:
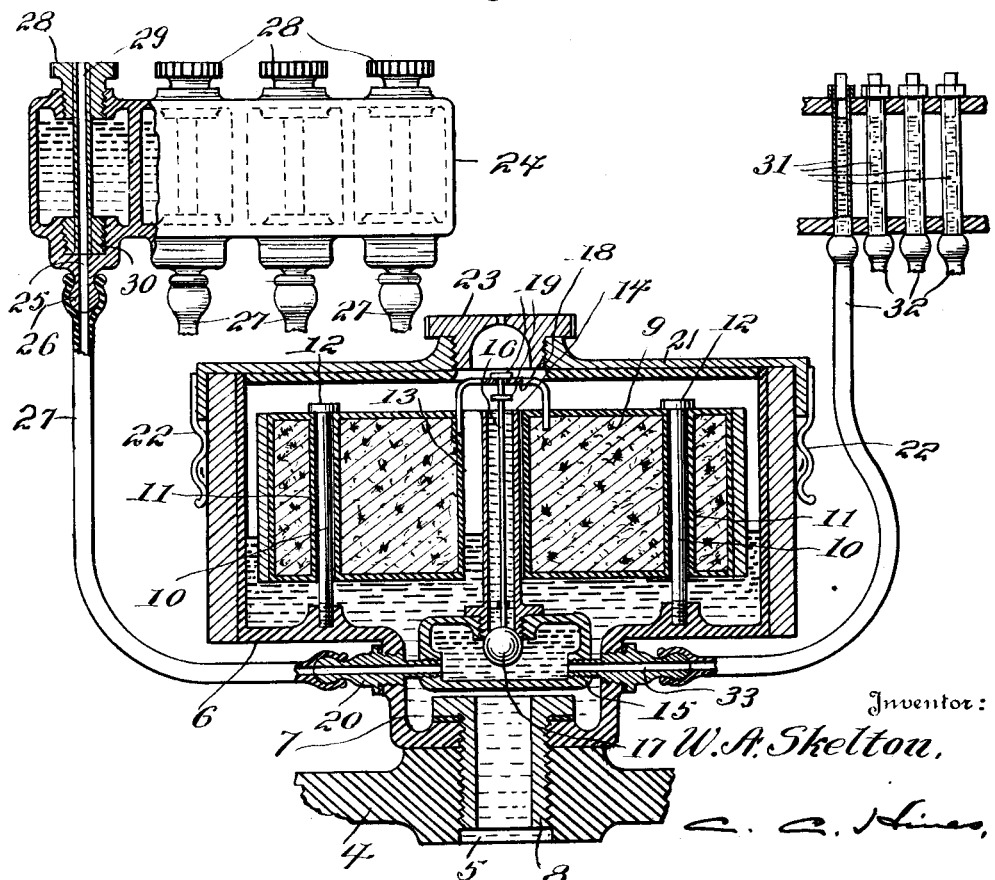

Figure 1 is a top plan view of a conventional form of multi-cell storage battery, and illustrating as applied thereto a refill device and indicator embodying the invention, and Figure 2 is an elevation, parts in section, on an enlarged scale, of the refill reservoir, float tank, and the liquid level indicator.

Referring now more particularly to the drawing, 3 indicates the storage battery, the same consisting of a number of cells represented at 4, the construction of which is well understood to those familiar with such devices. The float tank, of which there is one supplied for each cell of the battery, is attached to the cell in such manner that water contained therein may flow by gravity to the cell, and this portion of the device will first be described. As has been before stated, a float tank is provided for each of the cells, and as these several tanks are identical in construction, for the sake of brevity in the illustration and description, only one will be detailed.

The top of the battery cell is provided with the usual internally threaded aperture 5, ordinarily closed by a screw cap, as is well known. In the present instance, the screw cap is dispensed with, and the float tank to be hereafter detailed communicates with the interior of the cell through the said threaded opening.

The float tank is indicated at 6, and in the present instance is of rectangular shape having a depressed portion or well 7 depending from the middle portion of its bottom, and this well portion has an opening in its lower portion to register with the threaded opening 5 of the battery cell. A threaded nipple 8 passes through the opening in the well bottom and engages with the threads in opening 5 and firmly clamps the float tank 6 upon the upper or top portion of the battery cell. It is obvious, therefore, that the interior of the float tank is thus in direct communication with the interior of the cell. Arranged within the tank 6 is a float 9. This float may be of any preferred construction, and preferably is of a size to fit within the tank 6 so as to leave a proper space around all sides thereof between the said float and the walls of the tank. This float is held properly positioned within the chamber by the posts 10, the latter rising at spaced intervals from the bottom of the tank and passing loosely through openings 11 in float 9. The upper ends of these posts may be headed as at 12 to limit the upward movement of the said float.

The float 9 is provided with a central aperture 13 extending from the bottom to the top thereof and being somewhat larger than the tube 14 secured to and extending upwardly from the inlet chamber 15 arranged within the well 7 of the tank. The tube 14 passes entirely through the float 9, and the upper edge of the said tube preferably terminates even with the upper surface of the float when the latter has reached its uppermost position of movement. The chamber 15 can only communicate with the interior of the tank 6 through the tube 14.

The tube 14 has extending therethrough a rod or stem 16, to the lower end of which is attached a valve 17 adapted to seat against the lower end of the tube 14 to sever communication between chamber 15 and tank 6, and the upper end of the stem 16 extends through a cage 18 at the upper end of the float; heads 19 on the stem being engageable by said cage.

Liquid is admitted to chamber 15 through nipple 20, the latter being threaded into a side wall of well 7 and extending into the well and through a well in chamber 15. The fluid entering this nipple from a supply source considerably above the plane of tank 6, will pass into chamber 15. When the float is at its low position, the valve 17 will be similarly positioned, so that fluid may pass upwardly in the column or tube 14 and flow out of the top thereof and into the tank 6. As this flow continues the liquid level in the tank will rise, carrying with it the float 9, and when a predetermined level has been reached the cage 18 will cause the stem 16 to move upwardly, bringing valve 17 into closed position, whereupon further flow of liquid to tank 6 will be arrested. Should the liquid level in the tank be lowered, due to leakage in the cell or from evaporation of the liquid, the valve 17 will immediately be opened, whereupon the maximum liquid level in the tank will be restored. The upper part of tank 6 is closed by a cover plate indicated at 21, held normally in closed position by the spring clamps 22 at the sides, and the central portion of this plate has provided therein an opening closed by a vent cap 23. This cap is disposed directly above the central opening in the float and the hollow member 14, and the space between this hollow member and the walls of the central opening of the float is sufficiently large to permit of a hydrometer to be inserted therein to determine the character of the fluid within the tank.

The fresh water reservoir for the above-described refill tank is indicated at 24. This tank may be made of any suitable material and of any desired size, and is preferably divided into as many compartments as there are float tanks for the several battery cells. Each of the compartments has an opening 25 extending through its bottom and through a nipple 26 depending from the said compartment. Over this nipple is engaged one end of a pipe or conductor 27, the opposite end of the conductor being engaged over the nipple 20 on the corresponding float tank of the battery. Each compartment of the reservoir 24 is provided in its upper end with a filling opening closed by a cap 28, and this cap carries a downwardly extending tubular member 29 attached at its lower end to a plug or valve 30 in the bottom of the compartment. When the compartment is filled with water and it is desired to replenish the tank 6 therewith, it is but necessary to unscrew the cap 28, this action in turn causing plug 30 to be withdrawn from the base of the compartment, whereupon the fluid in the compartment will gravitate through the conductor 27 and into the chamber 15 in the float tank. When the desired quantity of water has passed into the said chamber, the flow will automatically cease, due to operation of valve 17 under influence of float 9. The cap 28 may then be replaced, this action causing plug 30 to become reseated. The tubular connection 29 between the upper and lower caps or plugs 28—30 acts as a vent for the discharge of gas which may have accumulated in the line.

Associated with the several float tanks of the battery are indicators or gages whereby it may at once be determined the liquid level in one or more of the several cells. This indicator includes a plurality of transparent tubes such as glass gage tubes indicated at 31. There will be one of these tubes provided for each of the several cells, and these tubes will be arranged in substantially the same plane with the reservoir 24. In the present embodiment of the invention, the improvement is applied to the storage battery of a motor vehicle, and the reservoir 24 may be attached to the dashboard or some other part of the mechanism convenient to the reach of the operator thereof. Similarly, the gages 31 will be located, preferably to the dash, of course, in the same horizontal plane with the reservoir 24. These gage glasses will communicate with a float tank of the battery, tubes 32 being employed in this connection. These tubes engage at their lower ends with nipples 33 of conductors leading into the chamber 15, and it is obvious, therefore, that as liquid enters the said chamber it will be indicated in the corresponding gage glass 31.

From the foregoing it is apparent that I have provided simple and expedient means for causing the several cells of the storage battery to be replenished with fresh water, and whereby the quantity of liquid contained within one or more of the cells may at once be determined. It will be noted that the tubes 27—32 communicate with chamber 15 at the bottom thereof. The purpose of this connection is to enable the chamber 15 to be drained when desired, it being simply necessary to remove one or both of the tubes 32 from connection with their respective nipples on the float tank. The device in the present instance discloses a float tank having a depressed well portion. However, should it be desired, such a depression in the tank bottom may be dispensed with and the tank provided with a flat bottom, as the chamber 15 may be moved up so as to be accommodated near the base of the tank without in any way interfering with the operation of the float. It is apparent, furthermore, that other changes in the details of construction and arrangement of the several parts may be resorted to, if desired, without departing from the spirit of the invention as defined by the claims.

Having thus fully described my invention, I claim:

1. In a device of the character described, the combination with a wet battery cell provided with a threaded filling inlet; of a tank disposed above the cell and having an offset in its bottom portion forming a well resting upon the cell, said well being provided in its bottom with an internally threaded opening, an inlet chamber disposed in said well and closed against communication with the bottom of the tank, a source of fluid supply leading to said chamber, a float within the tank, a discharge tube communicating at its lower end with the chamber and leading upwardly through the float to the top of the tank, valve mechanism controlled by the float for governing the flow of fluid from said chamber to the top of the tank through said tube, a water reservoir disposed above the level of the tank, a conductor leading from said reservoir to the chamber through the side of the well, and a tubular threaded fastening member engaging the threaded inlet of the cell and threaded bottom opening of the well and forming a combined fastening and conducting connection between the cell and tank.

2. In a device of the character described, the combination with the cells of a wet battery, of a liquid supply tank for each of said cells, a chamber in each of said tanks, valve mechanism governed by the height of liquid in said tanks for governing the flow of fluid from said chambers to said tanks, a reservoir disposed above the level of the tanks, said reservoir being divided into compartments corresponding in number to the battery cells, tubes leading from each compartment to the corresponding chamber of the battery cell, a valve in each compartment controlling communication between the same and the associated tube, a filling closure for each compartment, and a tubular conductor between the valve and filling closure for each compartment extending through said valve and closure and rigidly connecting the same.

3. In a device of the class described, the combination with a wet battery cell, of a tank in communication with said cell, said tank having a liquid inlet, a float within the tank, valve mechanism controlled by the float and governing the flow of fluid from said inlet to the tank, a reservoir above the level of the tank provided with an inlet at its upper end and an outlet at its lower end, a tubular conductor connecting said outlet of the reservoir with the inlet of the tank, a threaded closure for the inlet of the reservoir, a threaded valve governing the flow of liquid through the outlet of the reservoir, and a tubular connection between said closure and valve adapting the same to be operated in unison and forming a vent for the discharge of gases in the flow line.

4. In a device of the class described, the combination with a wet battery cell provided with a filling inlet; of a float tank, an offset well portion depending from the bottom of said float tank, a fastening element engaging the well portion and filling inlet of the cell and forming a conducting connection between said well portion and said cell, a closed chamber disposed in said well, a tube extending upwardly from said chamber, a float in said tank loosely surrounding said tube, a valve in said chamber, a stem connected to said valve and passing upwardly through said tube and connected with said float, and means for supplying liquid to said chamber.

5. In a device of the class described, the combination with the cells of a wet battery, of liquid supply tanks for each of said cells, a chamber in each of said tanks, valve mechanism governed by the height of liquid in said tanks for governing the flow of fluid from said chambers to said tanks, a reservoir disposed above the level of said tanks, the said reservoir being divided into compartments corresponding in number to the cells of said battery, tubes leading from each compartment to the corresponding chamber of the battery cell, a pair of plugs in each compartment, one of said plugs governing the communication between the compartment and the tube and the other closing the fill opening of the compartment, and a connection between said plugs.

In testimony whereof I affix my signature.

WALTER A. SKELTON.